(12) United States Patent
Al-Shafei

(10) Patent No.: US 9,394,491 B2
(45) Date of Patent: *Jul. 19, 2016

(54) PROCESS FOR IN-SITU ELECTROCHEMICAL OXIDATIVE GENERATION AND CONVERSION OF ORGANOSULFUR COMPOUNDS

(71) Applicant: SAUDI ARABIAN OIL COMPANY, Dhahran (SA)

(72) Inventor: Emad Naji Al-Shafei, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/487,726

(22) Filed: Sep. 16, 2014

(65) Prior Publication Data

US 2015/0001134 A1 Jan. 1, 2015

Related U.S. Application Data

(62) Division of application No. 13/559,864, filed on Jul. 27, 2012, now Pat. No. 8,871,951.

(60) Provisional application No. 61/513,208, filed on Jul. 29, 2011.

(51) Int. Cl.

| | |
|---|---|
| *C07D 495/00* | (2006.01) |
| *C10G 27/12* | (2006.01) |
| *B01J 19/08* | (2006.01) |
| *C10G 27/10* | (2006.01) |
| *C10G 32/02* | (2006.01) |
| *C10G 17/02* | (2006.01) |
| *C25B 1/30* | (2006.01) |
| *C01B 15/01* | (2006.01) |

(52) U.S. Cl.
CPC ............... *C10G 27/12* (2013.01); *B01J 19/087* (2013.01); *C01B 15/01* (2013.01); *C10G 17/02* (2013.01); *C10G 27/10* (2013.01); *C10G 32/02* (2013.01); *C25B 1/30* (2013.01); *B01J 2219/0809* (2013.01); *B01J 2219/0839* (2013.01); *B01J 2219/0841* (2013.01); *C10G 2300/1037* (2013.01); *C10G 2300/202* (2013.01); *C10G 2300/4037* (2013.01)

(58) Field of Classification Search
CPC .................................................. C07D 495/00
See application file for complete search history.

(56) References Cited

U.S. PATENT DOCUMENTS

| | | | |
|---|---|---|---|
| 1,992,310 | A | 2/1935 | Hultman |
| 3,309,413 | A | 3/1967 | Ferrara et al. |
| 3,558,450 | A | 1/1971 | Ashe et al. |
| 3,856,640 | A | 12/1974 | Halfar et al. |
| 3,915,819 | A | 10/1975 | Bell et al. |
| 4,357,217 | A | 11/1982 | Kuehn et al. |
| 4,384,931 | A | 5/1983 | Jasinski et al. |
| 5,565,073 | A | 10/1996 | Fraser et al. |
| 5,723,039 | A | 3/1998 | Zosimov et al. |
| 5,855,763 | A | 1/1999 | Conlin et al. |
| 5,968,337 | A | 10/1999 | Surma et al. |
| 6,274,026 | B1 | 8/2001 | Schucker et al. |
| 6,338,788 | B1 | 1/2002 | Schucker |
| 6,387,238 | B1 | 5/2002 | Merk et al. |
| 6,402,932 | B1 | 6/2002 | Bremer et al. |
| 7,479,215 | B2 | 1/2009 | Carson et al. |
| 7,611,620 | B2 | 11/2009 | Carson et al. |
| 2007/0051667 | A1 | 3/2007 | Martinie et al. |
| 2009/0159427 | A1* | 6/2009 | Greaney et al. .............. 204/172 |
| 2009/0272654 | A1 | 11/2009 | Brown et al. |
| 2011/0091790 | A1 | 4/2011 | Barnwell et al. |

FOREIGN PATENT DOCUMENTS

| | | |
|---|---|---|
| CN | 1399009 A | 2/2003 |
| CN | 1517430 A | 8/2004 |
| CN | 1782027 A | 6/2006 |

OTHER PUBLICATIONS

Drogui, P., et al. "Hydrogen peroxide production by water electrolysis: Application to disinfection." J. Applied Electrochem. (2001), vol. 31, pp. 877-882.*
PCT/US2012/048479, International Search Report and Written Opinion dated Nov. 8, 2012, 10 pages.
Li Wei et al., "Development of a cathodic oxidation system and its application to paired electrosynthesis of sulfones and nitrones," Journal of the Electrochemical Society, vol. 146, No. 2, Feb. 1999, pp. 592-599.
Derek Pletcher et al., "Indirect Oxidations Using Electrogenerated Hydrogen Peroxide," Acta Chemica Scandinavica, vol. 53, Jan. 1, 1999, pp. 745-750.
Chinese Patent Application No. 201280038508.X, Office Action dated Feb. 25, 2015.

* cited by examiner

*Primary Examiner* — Noble Jarrell
*Assistant Examiner* — John S Kenyon
(74) *Attorney, Agent, or Firm* — Abelman, Frayne & Schwab

(57) ABSTRACT

Hydrocarbon feedstocks are desulfurized by conversion of organosulfur compounds in a mixture of hydrocarbons into sulfoxides and/or sulfones. The oxidant used to promote oxidation of organosulfur-compounds is electrosynthesized in-situ.

24 Claims, 3 Drawing Sheets

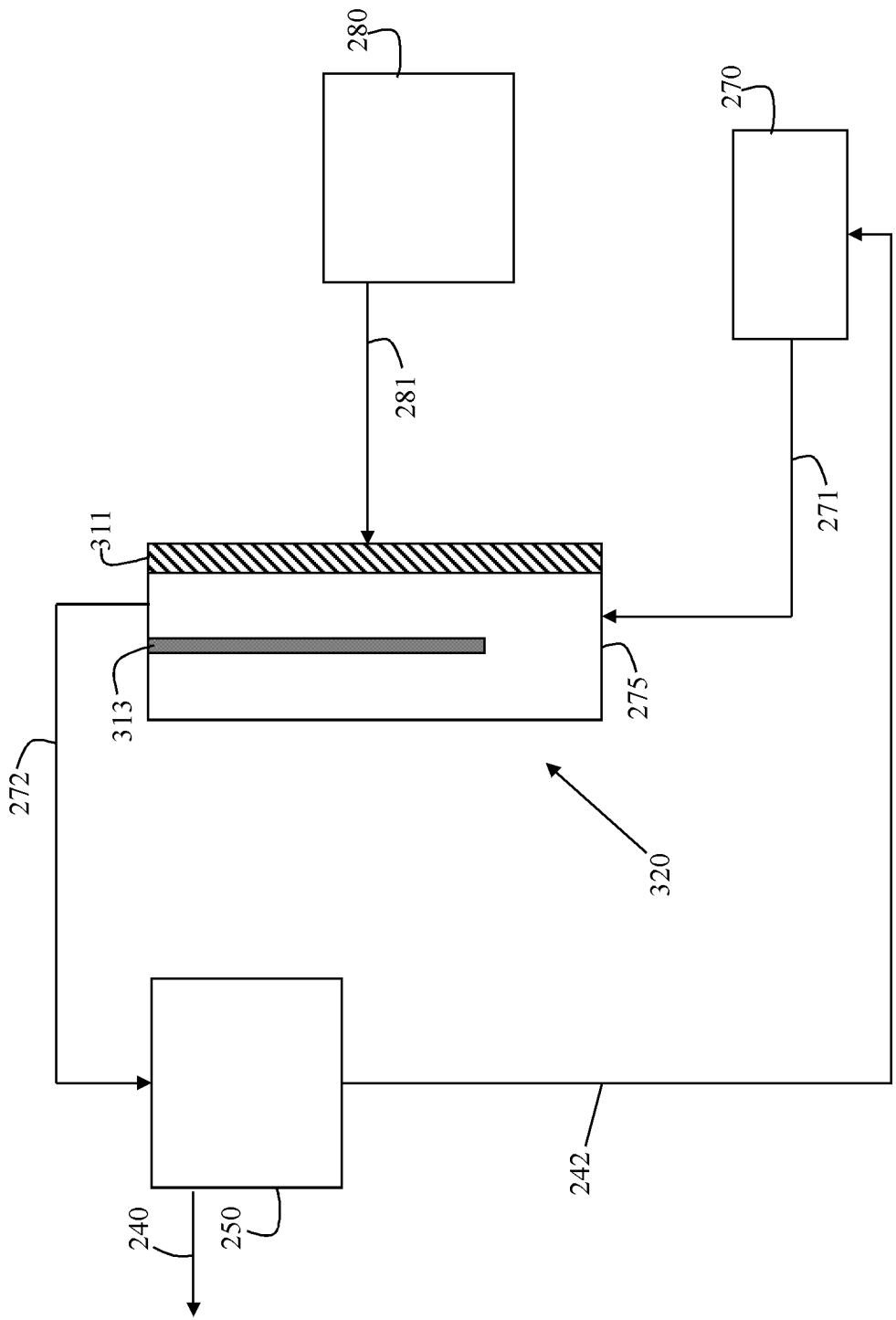

PROCESS FOR IN-SITU ELECTROCHEMICAL OXIDATIVE GENERATION AND CONVERSION OF ORGANOSULFUR COMPOUNDS

RELATED APPLICATIONS

This application is a divisional application of U.S. patent application Ser. No. 13/559,864, which claims the benefit of U.S. Provisional Patent Application No. 61/513,208 filed Jul. 29, 2011, the disclosures of which are hereby incorporated by reference.

BACKGROUND OF THE INVENTION

1. Field of the Invention

This invention relates to oxidative conversion of organosulfur compounds in a mixture of hydrocarbons using liquid oxidants.

2. Description of Related Art

Desulfurization of petroleum fractions of light and heavy gas oil is typically carried out in the refinery through the catalytic hydrodesulfurization (HDS). However, it is known that HDS treatment is limited, in particular due to the fact that sterically hindered organic sulfur compounds are not reactive at mild HDS conditions (e.g., 30 Kg/cm$^2$ of hydrogen partial pressure). The sulfur heteroatom in sterically hindered molecules, such as dibenzothiophene (DBT) derivatives including 4,6-dimethyldibenzothiophene (4,6-DMDBT), cannot be exposed to active catalytic sites in conventional HDS processes. Therefore aromatic rings in such sterically hindered sulfur molecule must first be hydrogenated, which requires high operating severity, in order to remove the steric hindrance surrounding the sulfur heteroatoms for catalytic HDS.

Oxidative desulfurization (ODS) is a known alternative or complementary process for deep desulfurization, and many ODS processes operate under relatively mild conditions and do not require use of hydrogen gas. In addition, ODS is efficient for desulfurization of organosulfur compounds such as DBT and its derivatives, particularly those characterized by one or more sterically hindered sulfur heteroatoms.

Typical ODS processes involve an oxidation step in which organic sulfur compounds are oxidized by a source of reactive oxygen. The oxidized organosulfur compounds are then removed or subject to further reaction to selectively remove the sulfur heteroatom. For instance, DBT and its derivatives are oxidized to produce DBT-sulfoxide and DBT-sulfone, which can be removed by known extraction and/or adsorption methods.

Known oxidants for ODS processes include liquid oxidants such as hydrogen peroxide or organic peroxides, or gaseous oxidant such as air or oxygen. However, certain process requirements and inefficiencies can pose operational or economic limitations to viable ODS operations.

In particular, transportation, handling and storage of liquid oxidants such as hydrogen peroxide and/or organic peroxides are potentially hazardous activities that require heightened safety precautions, and therefore impart significant expense in existing ODS processes.

Therefore, it would be desirable to provide an oxidative process for converting heteroatoms into their corresponding oxides that minimizes the need for transportation, handling and storage of hydrogen peroxide and/or organic peroxides.

BRIEF SUMMARY OF THE INVENTION

In accordance with one or more embodiments, a system and method are provided for oxidatively desulfurizing hydrocarbon feedstocks, and in particular to the oxidation steps to convert organosulfur compounds in a mixture of hydrocarbons into sulfoxides and/or sulfones.

In accordance with one or more embodiments, a process for converting organosulfur compounds in a liquid hydrocarbon feedstock containing, including in-situ production of oxidant, is provided. The process includes:
 a. providing an electrochemical reactor in which both in-situ production of oxidant and oxidative conversion of organosulfur compounds occur, the reactor including a gas-permeable and liquid-impermeable cathode, and an anode within an electrolyte compartment, the cathode and the anode electrically coupled to an electrical power source and spaced apart from one another;
 b. conveying acidic electrolyte and the liquid hydrocarbon feedstock into the electrolyte compartment, wherein hydrogen peroxide and hydrogen peroxide ions are electrosynthesized,
 c. oxidizing organosulfur compounds in the hydrocarbon feedstock with hydrogen peroxide formed in step (b) to produce oxidation products sulfoxides and/or sulfones of the organosulfur compounds; and
 d. removing a mixture of electrolyte and hydrocarbons including oxidation products from the electrolyte compartment.

In accordance with one or more additional embodiments, a process for converting organosulfur compounds in a liquid hydrocarbon feedstock containing, including in-situ production of oxidant, is provided. The process includes:
 a. providing an electrochemical reactor in which both in-situ production of oxidant and oxidative conversion of organosulfur compounds occur, the reactor including a gas diffusion electrode as a cathode in communication with a catholyte compartment, and an anode within an anolyte compartment, the cathode and the anode electrically coupled to an electrical power source and spaced apart from one another, and the catholyte compartment and anolyte compartment in fluid isolation and ionic communication via an ion-conducting membrane;
 b. conveying acidic catholyte and the liquid hydrocarbon feedstock into the catholyte compartment, and conveying acidic anolyte into the anolyte compartment, wherein hydrogen peroxide and hydrogen peroxide ions are electrosynthesized,
 c. oxidizing organosulfur compounds in the hydrocarbon feedstock with oxidant formed in step (b) to produce oxidation products sulfoxides and/or sulfones of the organosulfur compounds; and
 d. removing a mixture of electrolyte and hydrocarbons including oxidation products from the electrolyte chamber.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The foregoing summary as well as the following detailed description will be best understood when read in conjunction with the attached drawings. It should be understood, however, that the invention is not limited to the precise arrangements and apparatus shown. In the drawings the same or similar reference numerals are used to identify to the same or similar elements, in which:

FIG. 3 is a schematic process flow diagram of another embodiment of an oxidative desulfurization process using an electrochemical reactor with a common electrolyte.

DETAILED DESCRIPTION OF THE INVENTION

Figure 1:
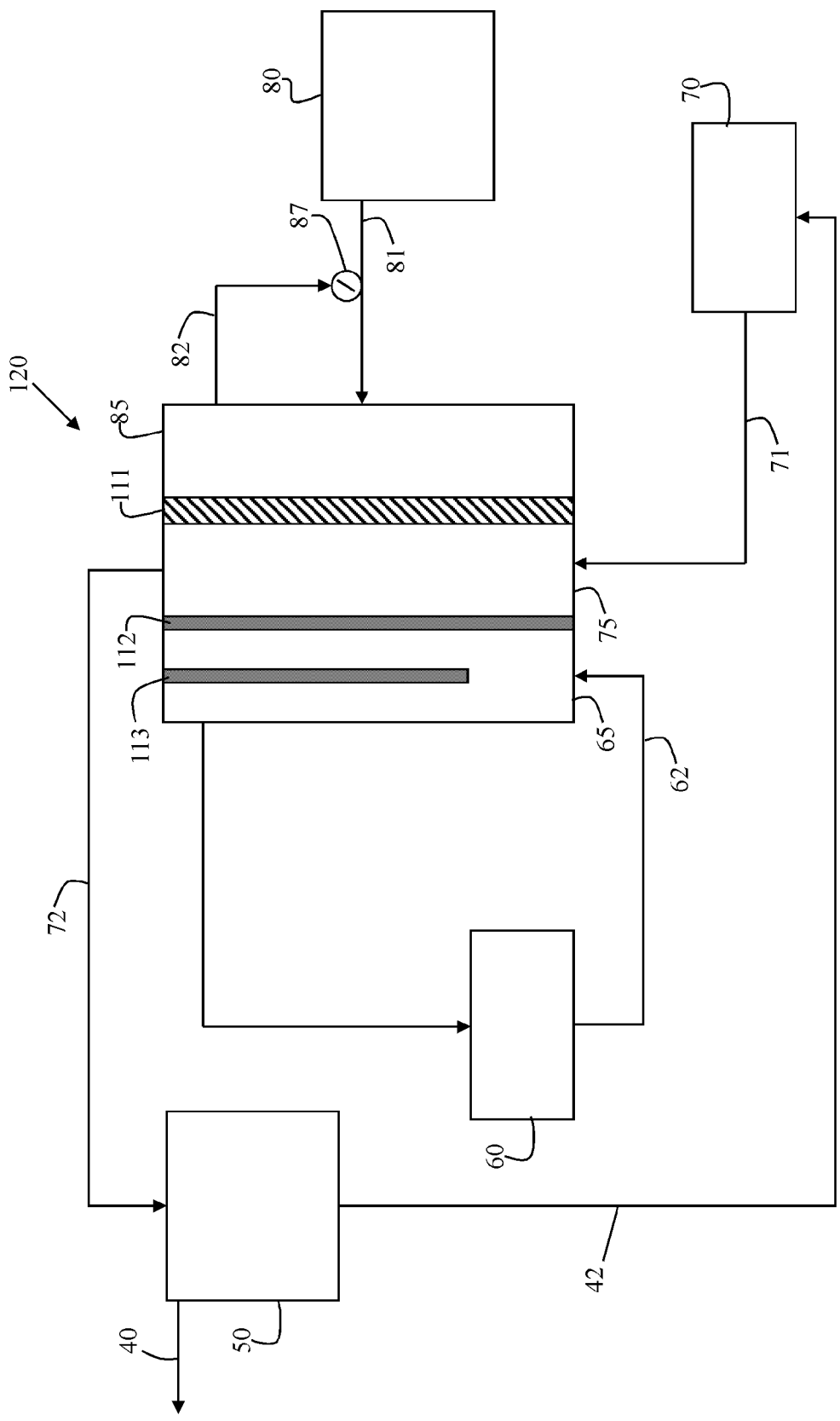
FIG. 1 is a schematic process flow diagram of an embodiment of an oxidative desulfurization process using an electrochemical reactor with separate anolyte and catholyte feeds.

Processes and systems for conversion of organosulfur compounds in a mixture with a hydrocarbon feedstock are provided in which the oxidant is produced in-situ in an electrochemical reactor. The process reduces or replaces the requirement for introduction of liquid oxidants in oxidative desulfurization processes such as hydrogen peroxide, organic peroxide and organic hydroperoxide from external sources that conventionally require transportation, handling and storage expenses and safety precautions.

Hydrogen peroxide ($H_2O_2$) and hydrogen peroxide ions ($HO_2^-$), as an intermediate, are generated as oxidation agents. The oxidation agents are combined with a hydrocarbon feedstream to oxidize organosulfur molecules. Both in-situ oxidant generation and oxidation of organosulfur compounds occur in the electrochemical reactor.

The electrochemical mechanism of in-situ oxidative generation is oxygen reduction in acidic media following a two-electron pathway in order to produce the hydrogen peroxide and hydrogen peroxide ions as represented in Equation [1]:

$$O_2 + 2H^+ + 2e^- \rightarrow HO_2^- \rightarrow H_2O_2 \quad [1]$$

In certain embodiments, hydrogen peroxide is generated in an electrochemical reactor in the range of about 200 to about 40,000 ppmw, in further embodiments in the range of about 200 to about 10,000 ppmw, and in additional embodiments in the range of about 200 to about 1,000 ppmw. The quantity of hydrogen peroxide generated generally depends on of the sulfur content of the feed.

In certain embodiments in which acetic acid or adipic acid are used, peroxyacetic or peroxy adipic, respectively, are co-generated with hydrogen peroxide and hydrogen peroxide ions.

The oxidation reaction of organosulfur compounds with $H_2O_2$ produces corresponding sulfoxides and/or sulfones. For instance, a one-step reaction includes formation of sulfoxide molecules of DBT (Equation [2]). A two-step reaction includes formation of sulfone molecules of DBT (Equation [3]). Similar reactions occur with derivatives of DBT, including sterically hindered DBT derivatives such as 4,6-DMDBT.

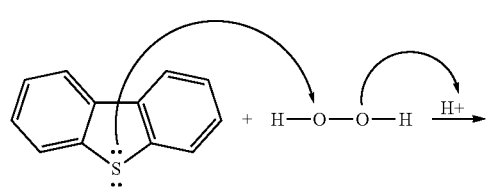

[2]

[3]

The configuration of the electrochemical reactor can vary. In certain embodiments, a continuous stirred tank reactor (CSTR) is provided having a cathode and an anode. The cathode is a gas diffusion electrode situated on one side of the reactor having a surface in fluid communication with an oxygen source, such as ambient air outside of the reactor or a controlled oxygen source. The anode can be in an electrolyte chamber or in an anolyte chamber, depending on the reactor configuration. The cathode and anode are connected to a suitable voltage source that applies a current across the electrodes. The overall cell potential of the electrochemical reactor is generally about 0.2 to about 10.0 volts, and in certain embodiments about 0.7 to about 3.0 volts. The current of the electrochemical reactor is generally about 100 to about 2000 mA/cm$^2$, and in certain embodiments about 500 to about 1500 mA/cm$^2$. The energy consumption of the system is about 2 to about 18 kWh kg$^{-1}$ $H_2O_2$.

A gaseous source of oxygen, e.g., air, is introduced to the outside-facing surface of the cathode and oxygen ions are formed. These oxygen ions combine with hydrogen cations from the acidic electrolyte or anolyte media to form hydrogen peroxide ions and hydrogen peroxide as represented by Equation [1] above. Plural reactors can be arranged in series.

The temperature conditions in the reactor and electrolyte tanks (including the hydrocarbon feedstream) is about 35° C. to about 90° C., in certain embodiments about 45° C. to about 70° C. The reactor pressure can be atmospheric pressure.

The mixture of hydrocarbon products including oxidized sulfur-containing hydrocarbons can be subjected to solvent extraction to extract the sulfones and sulfoxides from the hydrocarbon product. Alternatively, or in combination, mixture of hydrocarbon products including oxidized sulfur-containing carbons can be subjected to one or more processes suitable to convert the oxidized sulfur-containing hydrocarbon compounds into sulfur-free hydrocarbon compounds.

FIG. 1 shows an embodiment of an electrochemical reactor 120 in fluid communication with a catholyte tank 70, an anolyte tank 60, an air/oxygen tank 80 and a liquid separator tank 50. Electrochemical reactor 120 is a gas diffusion electrode reactor, which includes three compartments, namely an optional oxygen compartment 85, a catholyte compartment 75 and an anolyte compartment 65. A membrane 112, such as a sulfonated membrane, is positioned between catholyte compartment 75 and anolyte compartment 65, which allows ions to shuttle between the compartments but prevents liquid passage therebetween.

Reactor 120 includes a gas-permeable and liquid-impermeable carbon-based cathode 111 for oxygen reduction, and an anode 113 connected to a suitable voltage source (not shown). Anode 113 is positioned in anolyte compartment 65. Cathode 111 is an outer boundary of catholyte compartment 75 and is positioned in spaced-apart relation to membrane 112, e.g., on a side of catholyte compartment 75 opposite the side having membrane 112, although other arrangements are possible depending on the cell configuration.

Oxygen or a suitable oxygen-containing gas such as air from air/oxygen tank 80 is introduced to oxygen compartment 85 via conduit 81 in fluid communication between air/oxygen tank 80 and oxygen compartment 85, including a suitable pressure regulator 87 for regulating the oxygen pressure generally from about 1 psig to about 150 psig, in certain embodiments about 1 psig to about 100 psig and in further embodiments about 1 psig to about 25 psig. Any excess gas can be circulated via conduit 82 and recycled to air/oxygen tank 80. Note that in certain embodiments, the air/oxygen feed can be introduced directly to cathode 111 (not shown), i.e., without initial passage through oxygen compartment 85 as shown in FIG. 1.

Catholyte tank 70 includes a mixture of aqueous catholyte and a hydrocarbon feed containing organosulfur compounds to be oxidized, such as a diesel feedstock. The mixture is introduced to catholyte compartment 75 of reactor 120 via a conduit 71. Electrosynthesis of hydrogen peroxide and hydrogen peroxide ions occurs in catholyte compartment 75. The hydrogen peroxide and hydrogen peroxide ions which are generated in-situ serve as the oxidant for oxidation of sulfur-containing hydrocarbons in the feedstock. A combined stream of catholyte and the hydrocarbon mixture including oxidized organosulfur compounds is pumped or otherwise removed from catholyte compartment 75 via conduit 72 and is collected in liquid separator tank 50, e.g., a centrifugal separator or other suitable phase separation apparatus. The combined stream is separated into a hydrocarbon phase which is recovered as stream 40, and a catholyte phase which is recycled as stream 42 to catholyte tank 70. Anolyte is conveyed to anolyte compartment 65 via conduit 62 and is recycled to anolyte tank 60 via conduit 63. Stream 40 can be subjected to solvent extraction (not shown) to extract the sulfones and sulfoxides from sulfur-free hydrocarbon compounds, and/or subjected to one or more processes (not shown) suitable to convert the oxidized sulfur-containing hydrocarbon compounds into sulfur-free hydrocarbon compounds to maximize the product yield.

Figure 2:
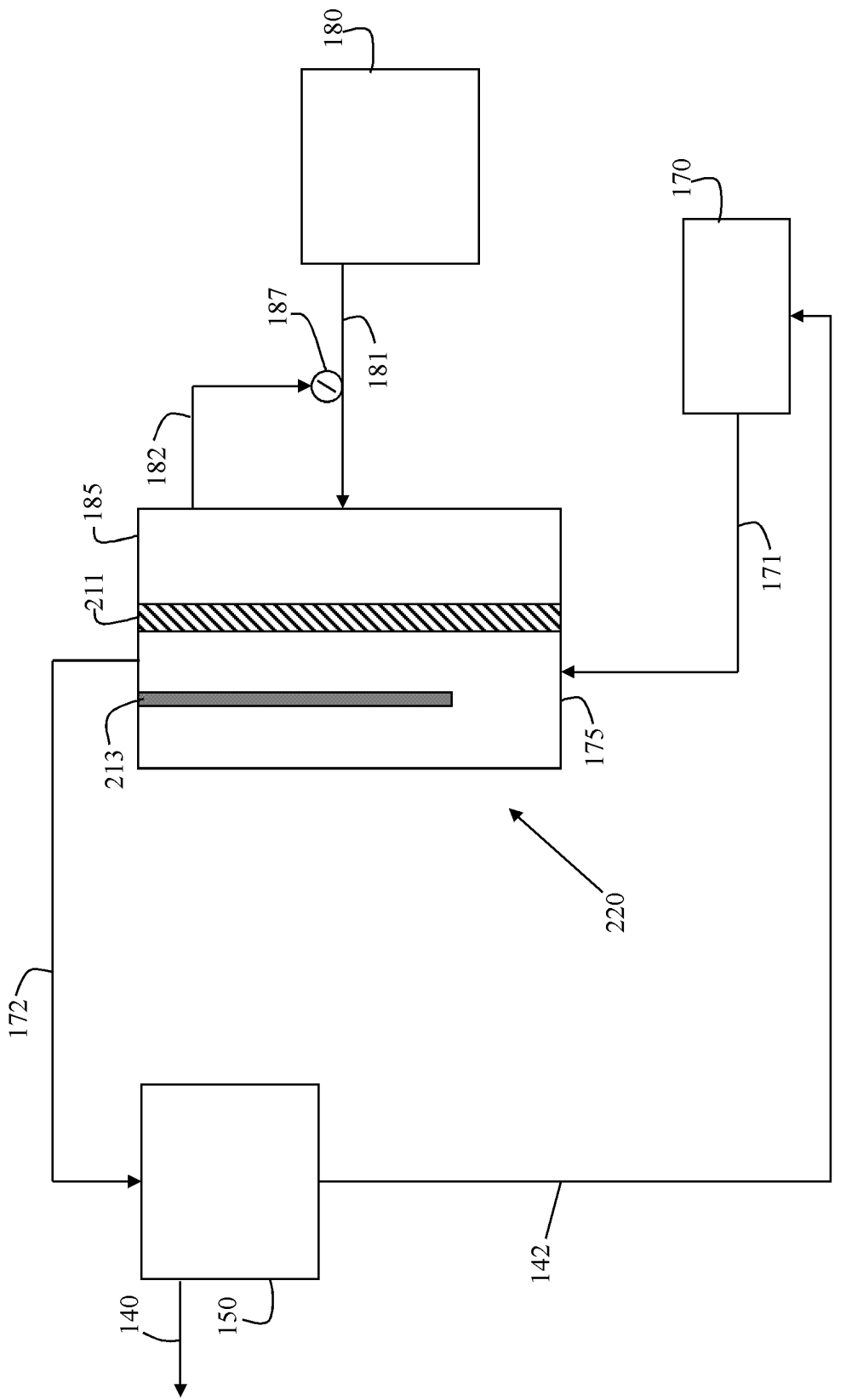
FIG. 2 is a schematic process flow diagram of an embodiment of an oxidative desulfurization process using an electrochemical reactor with a common electrolyte.

FIG. 2 shows another embodiment of an electrochemical oxidative conversion system and process in which an ion-conducting electrolyte is provided. In particular, an electrochemical reactor 220 fluid communication with an electrolyte tank 170, an air/oxygen tank 180 and a liquid separator tank 150. Electrochemical reactor 220 is a gas diffusion electrode reactor which includes an optional oxygen compartment 185 and an electrolyte compartment 175.

Reactor 220 includes a gas-permeable and liquid-impermeable carbon-based cathode 211 for oxygen reduction and an anode 213, both connected to a suitable voltage source (not shown). Anode 213 is located in the electrolyte compartment. Cathode 211 is an outer boundary of the electrolyte compartment 175 and is positioned in spaced-apart relation to anode 213, although other arrangements are possible depending on the cell configuration.

Oxygen or a suitable oxygen-containing gas such as air from air/oxygen tank 180 is introduced to oxygen compartment 185 via conduit 181 in fluid communication between air/oxygen tank 180 and oxygen compartment 185, including a suitable pressure regulator 187 for regulating the oxygen pressure generally from about 1 psig to about 150 psig, in certain embodiments about 1 psig to about 100 psig and in further embodiments about 1 psig to about 25 psig. Any excess gas is circulated via outlet 182 and recycled to oxygen tank 180. Note that in certain embodiments, the air/oxygen feed can be introduced directly to cathode 211 without preliminary introduction into chamber 185 shown in FIG. 2, e.g., in the configuration shown in FIG. 3.

Electrolyte tank 170 includes a mixture of aqueous electrolyte and the hydrocarbon feed containing organosulfur compounds to be oxidized such as a diesel feedstock. The mixture is introduced to electrolyte compartment 175 of reactor 220 via conduit 171. Hydrogen peroxide and hydrogen peroxide ions are electrosynthesized in electrolyte compartment 175. Hydrogen peroxide and hydrogen peroxide ions generated in-situ serve as oxidant for oxidation of sulfur-containing hydrocarbons in the feedstock. A combined stream of electrolyte and the hydrocarbon mixture including oxidized organosulfur compounds is pumped or otherwise conveyed from electrolyte compartment 175 via conduit 172 and is collected in liquid separator tank 150, e.g., a centrifugal separator or other suitable phase separation apparatus. The combined stream is separated into a hydrocarbon phase which is recovered as a stream 140, and a catholyte phase which is recycled as stream 142 to catholyte tank 170. Stream 140 can be subjected to solvent extraction (not shown) to extract the sulfones and sulfoxides from sulfur-free hydrocarbon compounds, and/or subjected to one or more processes (not shown) suitable to convert the oxidized sulfur-containing hydrocarbon compounds into sulfur-free hydrocarbon compounds to maximize the product yield.

FIG. 3 shows yet another embodiment of an electrochemical oxidative conversion system and process. An electrochemical reactor 320 includes an electrolyte tank 270, an air/oxygen tank 280 and a liquid separator tank 250. The electrochemical reactor 320 is a gas diffusion electrode reactor which includes an electrolyte compartment 275.

Reactor 320 includes a gas-permeable and liquid-impermeable carbon-based cathode 311 for oxygen reduction and an anode 313 connected to a suitable voltage source (not shown). Anode 313 is located in the electrolyte compartment. Cathode 311 is an outer boundary of electrolyte compartment 275 and is positioned in spaced-apart relation to anode 313, although other arrangements are possible depending on the cell configuration.

Oxygen or a suitable oxygen-containing gas such as air from the air/oxygen tank 280 is introduced to cathode 311 via conduit 281, whereby the oxygen pressure can be controlled with a suitable pressure regulator (not shown) generally from about 1 psig to about 150 psig, in certain embodiments about 1 psig to about 100 psig and in further embodiments about 1 psig to about 25 psig.

Electrolyte tank 270 includes a mixture of aqueous electrolyte and the hydrocarbon feed containing organosulfur compounds to be oxidized such as a diesel feedstock. The mixture is introduced to the electrolyte compartment of the reactor 320 via conduit 271. In the electrolyte compartment 275, electrosynthesis of hydrogen peroxide and hydrogen peroxide ions occurs, and the hydrogen peroxide and hydrogen peroxide ions generated in-situ serve as the oxidant for oxidation of sulfur-containing hydrocarbons in the feedstock. A combined stream of electrolyte and the hydrocarbon mixture including oxidized organosulfur compounds is pumped from electrolyte compartment 275 via conduit 272 and is collected in the liquid separator tank 250, such as a centrifugal separator or other suitable phase separation apparatus. The combined stream is separated into a hydrocarbon phase, which is recovered as a stream 240, and the catholyte phase, which is recycled as stream 242 to the catholyte tank 270. Stream 240 can be subjected to solvent extraction (not shown) to extract the sulfones and sulfoxides from sulfur-free hydrocarbon compounds, and/or subjected to one or more processes (not shown) suitable to convert the oxidized sulfur-containing hydrocarbon compounds into sulfur-free hydrocarbon compounds to maximize the product yield.

In certain embodiments, one or more identical or different electrochemical reactors described herein are arranged in series in order to increase the electrochemically generated hydrogen peroxide and this increase the feedstock oxidation.

The cathodes used in the systems shown and described with respect to FIGS. 1-3 are generally gas diffusion electrodes. These gas diffusion electrodes convert atmospheric or pressurized oxygen gas into oxygen ions upon application of a voltage between it and a compatible anode. Preferably, the selected gas diffusion electrodes are capable of high oxygen throughput and high current density, for instance, constructed of high surface-area carbon base materials, such as noble metal catalyst supports as used in fuel cells and electrochemical cells. In addition, suitable carbon-based electrodes are characterized by minimal or no leaching of metals into the aqueous or organic phases in the catholyte or electrolyte compartments.

Suitable cathodes include base materials of carbon-polytetrafluoroethylene (carbon-PTFE), carbon cloth having 5 to 50 weight % platinum, reticulated vitreous carbon (RVC), platinized-titanium electrodes, glassy carbon, carbon-PTFE with nickel mesh, or iron mesh/carbon cloth composites.

The anode is selected to provide a suitable counter electrode to the gas diffusion cathode. Generally, the selected anode has minimal solubility in system fluids, e.g., anolyte or electrolyte, and preferably is insoluble in the system fluids, the thereby minimize or eliminate the likelihood of dissolved materials from the anode to contaminate the fluids. The negative voltage repels protons from the acid in the anolyte or electrolyte and facilitates combination to form hydrogen peroxide and hydrogen peroxide ions. Suitable anode materials include platinum gauze, stainless steel gauze, silver-plated nickel screen, Ti/Pt anode, boron-doped diamond (BDD) such as silicon with BDD thin film electrode, iron wire, platinum foil, acryl resin, aluminum gauze, aluminum with carbon, cesium with iron gauze, cesium with carbon, glassy carbon, and carbon-PTFE.

In the system configuration of FIG. 1, a proton-exchanging membrane is employed to allow protons to shuttle between the anolyte compartment and the catholyte compartment and prevent transfer of the ions of hydrogen peroxide ($HO_2^-$) while maintaining liquid separation. Suitable membranes include sulfonated membrane such as those commercially available from Dupont (Nafion®) or sulfonated PFCB from Tetramer Technologies. The selected membrane has thermal stability and mechanical stability generally up to about 150° C.

In the system configuration of FIG. 1, complementary catholyte/anolyte reactants are used, while in the system configurations of FIGS. 2-3, electrolytes are used. The pH of the catholyte or electrolyte is between 1 and 4. The hydrocarbon: electrolyte ratio can be about 20:1 to about 2:1.

Suitable catholyte/anolyte systems include:

1. Catholyte: 0.01 to 1.0 M of $Na_2SO_4$ adjusted with $H_2SO_4$ to a pH 1 to 3
   Anolyte: 0.05 to 0.8 M $H_2SO_4$;
2. Catholyte 0.01 to 1.0 M of HCl mixed with 0.1 to 1.0 M NaCl
   Anolyte: 0.1 to 1.0 M HCl;
3. Catholyte: 0.05 to 1.0 M $H_2SO_4$ mixed with 0.05 to 1.0 M $K_2SO_4$
   Anolyte: 0.1 to 1.0 M $Na_2SO_4$; or
4. Catholyte: 0.1 to 3 M acetic acid or adipic acid having a pH of 1 to 4
   Anolyte 0.1 to 1.0 M $Na_2SO_4$.

Suitable electrolytes (for use in the process configurations of FIGS. 2-3) include:

1. 0.01 to 1.0 M of $Na_2SO_4$ adjusted with $H_2SO_4$ to a pH of 1 to 3;
2. 0.01 to 1.0 M of $NaNO_3$ adjusted with $HNO_3$ to a pH of 1 to 3;
3. 0.01 to 2.0 M of $HNO_3$ having a pH of 1 to 3; or
4. 0.1 to 3 M acetic acid or adipic acid having a pH of 1 to 4.

Optionally, a solid catalyst can be introduced to increase the rate of reaction for oxidative desulfurization. Suitable catalysts are metal oxides of elements from Group VB, VI or JIB of the Periodic Table, including zinc, lead, vanadium, molybdenum, magnesium, calcium, nickel, copper, cobalt, tin, oxide and iron. The catalysts can be provided in an amount of about 0.2 to about 2% of the combined electrolyte (or catholyte) and hydrocarbon feed. The oxidation catalyst can be added as solid particles to the electrochemical reactor, integrated directly in the cathode and/or integrated as a coating in the electrochemical reactor.

Catalysts can be homogeneous or heterogeneous, including polyoxometalates, formic acid, acetic acid, titanium silicate, vanadosilicates, magnesium lanthanide oxides, W-layered double hydroxide, $Mo/Al_2O_3$, cobalt salts, silica, silica functionalized with peroxycarboxylic groups, Fenton catalyst, $MnO_2/Al_2O_3$, $Co_3O_4/Al_2O_3$, $V_2O_5/TiO_2$, $Al_2O_3$, metal-sulfophtalocyanine, Fe/Carbon, $H_3PW_{12}O_{40}$-$SBA_{15}$, CoAPO-5 and $W/ZrO_2$, $Al_2O_3$, or combinations of the foregoing.

In-situ oxidative desulfurization utilizing an electrolyte including acetic acid or adipic acid results in the co-generation of peroxyacetic or peroxy adipic acid. The co-generated peroxyacetic and peroxy adipic acid also serve as co-oxidants and/or catalysts and increase the rate of oxidation of organic sulfur to sulfoxides and sulfones.

Suitable feedstocks for use in the present process and system include but are not limited to straight run, hydrotreated, and/or fractioned naphtha, gasoline, diesel, and gas oil.

The process of the invention has been described and explained with reference to the schematic process drawings and examples. Additional variations and modifications will be apparent to those of ordinary skill in the art based on the above description and the scope of the invention is to be determined by the claims that follow.

What is claimed is:

1. A process for converting organosulfur compounds in a liquid hydrocarbon feedstock to oxidation products sulfoxides and/or sulfones of the organosulfur compounds, including in-situ production of oxidant, the process comprising:
   a. providing an electrochemical reactor in which both in-situ production of oxidant and oxidative conversion of organosulfur compounds occur, the reactor including a gas diffusion electrode as a cathode in communication with a catholyte compartment, and an anode within an anolyte compartment, the cathode and the anode electrically coupled to an electrical power source and spaced apart from one another, and the catholyte compartment and anolyte compartment in fluid isolation and ionic communication via an ion-conducting membrane;
   b. conveying a gaseous source of oxygen to an outer surface of the gas diffusion electrode to form oxygen ions;
   c. conveying acidic catholyte and the liquid hydrocarbon feedstock into the catholyte compartment, and conveying acidic anolyte into the anolyte compartment, wherein hydrogen peroxide and hydrogen peroxide ions are electrosynthesized by reaction of oxygen ions generated at the gas diffusion electrode and hydrogen cations from the acidic catholyte,
   d. oxidizing organosulfur compounds in the hydrocarbon feedstock with oxidant formed in step (c) to produce oxidation products sulfoxides and/or sulfones of the organosulfur compounds; and
   e. removing a mixture of catholyte and hydrocarbons including oxidation products from the catholyte compartment.

2. The process as in claim 1, wherein the catholyte comprises 0.01 to 1.0 M of $Na_2SO_4$ adjusted with $H_2SO_4$ to a pH 1 to 3 and the anolyte comprises 0.05 to 0.8 M $H_2SO_4$.

3. The process as in claim 1, wherein the catholyte comprises 0.01 to 1.0 M of HCl mixed with 0.1 to 1.0 M NaCl and the anolyte comprises 0.1 to 1.0 M HCl.

4. The process as in claim 1, wherein the catholyte comprises 0.05 to 1.0 M of $H_2SO_4$ mixed with 0.05 to 1.0 M $K_2SO_4$ and the anolyte comprises 0.1 to 1.0 M $Na_2SO_4$.

5. The process as in claim 1, wherein the catholyte comprises acetic acid having a pH of 1 to 4 and the anolyte comprises 0.1 to 1.0 M $Na_2SO_4$.

6. The process as in claim 1, wherein the catholyte comprises adipic acid having a pH of 1 to 4 and the anolyte comprises 0.1 to 1.0 M $Na_2SO_4$.

7. The process as in claim 1 further including contacting the liquid hydrocarbon feedstock with an oxidation catalyst.

8. The process as in claim 5, wherein peroxyacetic is cogenerated and serves as co-oxidant and/or catalyst.

9. The process as in claim 6, wherein peroxy adipic is cogenerated and serves as co-oxidant and/or catalyst.

10. The process as in claim 7, wherein the oxidation catalyst is added as solid particles to the electrochemical reactor.

11. The process as in claim 7, wherein the oxidation catalyst is integrated directly in the cathode.

12. The process as in claim 7, wherein the oxidation catalyst is integrated as a coating in the electrochemical reactor.

13. A process for converting organosulfur compounds in a liquid hydrocarbon feedstock to oxidation products sulfoxides and/or sulfones of the organosulfur compounds, including in-situ production of oxidant, the process comprising:
   a. providing an electrochemical reactor in which both in-situ production of oxidant and oxidative conversion of organosulfur compounds occur, the reactor including a gas diffusion electrode as a cathode in communication with a catholyte compartment, and an anode within an anolyte compartment, the cathode and the anode electrically coupled to an electrical power source and spaced apart from one another, and the catholyte compartment and anolyte compartment in fluid isolation and ionic communication via an ion-conducting membrane;
   b. conveying acidic catholyte and the liquid hydrocarbon feedstock into the catholyte compartment, and conveying acidic anolyte into the anolyte compartment, wherein hydrogen peroxide and hydrogen peroxide ions are electrosynthesized, and wherein the acidic catholyte and the acidic anolyte are selected from the group consisting of
   0.01 to 1.0 M of $Na_2SO_4$ adjusted with $H_2SO_4$ to a pH 1 to 3 as catholyte, and 0.05 to 0.8 M $H_2SO_4$ as anolyte;
   0.01 to 1.0 M of HCl mixed with 0.1 to 1.0 M NaCl as catholyte, 0.1 to 1.0 M HCl as anolyte;
   0.05 to 1.0 M of $H_2SO_4$ mixed with 0.05 to 1.0 M $K_2SO_4$ as catholyte, and 0.1 to 1.0 M $Na_2SO_4$ as anolyte;
   acetic acid having a pH of 1 to 4 catholyte, and comprises 0.1to 1.0M $Na_2SO_4$ as anolyte; and
   adipic acid having a pH of 1 to 4 as catholyte, and 0.1 to 1.0 M $Na_2SO_4$ as anolyte;
   c. oxidizing organosulfur compounds in the hydrocarbon feedstock with oxidant formed in step (b) to produce oxidation products sulfoxides and/or sulfones of the organosulfur compounds; and
   d. removing a mixture of catholyte and hydrocarbons including oxidation products from the catholyte compartment.

14. The process as in claim 13, wherein the catholyte comprises 0.01 to 1.0 M of $Na_2SO_4$ adjusted with $H_2SO_4$ to a pH 1 to 3 and the anolyte comprises 0.05 to 0.8 M $H_2SO_4$.

15. The process as in claim 13, wherein the catholyte comprises 0.01 to 1.0 M of HCl mixed with 0.1 to 1.0 M NaCl and the anolyte comprises 0.1 to 1.0 M HCl.

16. The process as in claim 13, wherein the catholyte comprises 0.05 to 1.0 M of $H_2SO_4$ mixed with 0.05 to 1.0 M $K_2SO_4$ and the anolyte comprises 0.1 to 1.0 M $Na_2SO_4$.

17. The process as in claim 14, wherein the catholyte comprises acetic acid having a pH of 1 to 4and the anolyte comprises 0.1 to 1.0 M $Na_2SO_4$.

18. The process as in claim 17, wherein peroxyacetic is cogenerated and serves as co-oxidant and/or catalyst.

19. The process as in claim 15, wherein the catholyte comprises adipic acid having a pH of 1 to 4 and the anolyte comprises 0.1 to 1.0 M $Na_2SO_4$.

20. The process as in claim 19, wherein peroxy adipic is cogenerated and serves as co-oxidant and/or catalyst.

21. The process as in claim 13 further including contacting the liquid hydrocarbon feedstock with an oxidation catalyst.

22. The process as in claim 21, wherein the oxidation catalyst is added as solid particles to the electrochemical reactor.

23. The process as in claim 21, wherein the oxidation catalyst is integrated directly in the cathode.

24. The process as in claim 21, wherein the oxidation catalyst is integrated as a coating in the electrochemical reactor.

* * * * *